United States Patent
Toerner

(10) Patent No.: US 6,705,171 B1
(45) Date of Patent: Mar. 16, 2004

(54) TORQUE MEASURING DEVICE FOR A DEVICE MEASURING THE FLOW OF MATERIAL

(75) Inventor: Ludger Toerner, Eppertshausen (DE)

(73) Assignee: Schenck Process GmbH, Darmstadt (DE)

( * ) Notice: Subject to any disclaimer, the term of this patent is extended or adjusted under 35 U.S.C. 154(b) by 0 days.

(21) Appl. No.: 09/913,307

(22) PCT Filed: Feb. 7, 2000

(86) PCT No.: PCT/EP00/00947
§ 371 (c)(1),
(2), (4) Date: Aug. 10, 2001

(87) PCT Pub. No.: WO00/47955
PCT Pub. Date: Aug. 17, 2000

(30) Foreign Application Priority Data

Feb. 12, 1999 (DE) .......................................... 199 05 951

(51) Int. Cl.⁷ .................................................. G01F 1/84
(52) U.S. Cl. .............................. 73/861.354; 73/861.353
(58) Field of Search ...................... 73/861.354, 861.535

(56) References Cited

U.S. PATENT DOCUMENTS 5,353,647 A * 10/1994 Toerner ................. 73/861.354
6,073,494 A * 6/2000 Soderholm et al. .... 73/861.354

FOREIGN PATENT DOCUMENTS

| DE | 2544976 | 4/1977 |
|---|---|---|
| DE | 3346145 | 7/1985 |
| DE | 19504992 | 3/1996 |
| DE | 19605910 | 8/1997 |
| DE | 19611562 | 9/1997 |
| EP | 0590187 | 4/1994 |
| EP | 0845662 | 6/1998 |
| EP | 0857951 | 8/1998 |
| EP | 0857952 | 8/1998 |
| EP | 0866318 | 9/1998 |

* cited by examiner

Primary Examiner—Harshad Patel
(74) Attorney, Agent, or Firm—W. F. Fasse; W. G. Fasse

(57) ABSTRACT

The invention relates to a device for measuring the flow of material, especially of a flow of bulk material, according to the Coriolis principle of measurement. The device has an impeller (2) which is driven by a motor (9) with a constant r.p.m. The flow of material is fed to the impeller (2) and is radially deflected. The driving torque is measured by a torque measuring sensor. The driving torque is transmitted to a force sensor (22) by a pivot bearing (12) for determining the torque. The force-sensing element (22) has at least two horizontal leaf springs (16, 17) which cross each other and which are arranged in such a way that the crossing point of the leaf springs (16, 17) coincides with a rotational axis (13). A thrust bearing (14) is integrated into the pivot bearing (12). The weight of the drive train is transmitted to a stationary housing (8) by the thrust bearing (14) with the help of a ball bearing or toe bearing. A frictionless air bearing (3) is provided for horizontally supporting the drive shaft (5) in order to improve the measuring accuracy.

11 Claims, 3 Drawing Sheets

TORQUE MEASURING DEVICE FOR A DEVICE MEASURING THE FLOW OF MATERIAL

FIELD OF THE INVENTION

The invention relates to a device for measuring a mass flow, particularly of a bulk material flow whereby the Coriolis measuring principle is employed.

BACKGROUND INFORMATION

For a precise ascertaining of the weight of material flows the effective inertia force (Coriolis force) is utilized for the mass determination. The Coriolis force occurs at the coupling of a moved mass particle with a rotating reference body. For this purpose the material flow is supplied to a disk provided with radial guide vanes, whereby the bulk material is centrifuged substantially perpendicularly to the rotational axis of the disk. The torque moment of the disk rotating with a constant r.p.m. varies in accordance with the Coriolis force, whereby the torque moment change is proportional.

Such a measuring device for the continuous ascertaining of the weight of material flows is known from German Patent Publication DE-OS 3,346,145. In that measuring device an impeller rotating with a constant r.p.m. is driven by an electric motor arranged directly above. The motor is supported in a stationary housing in the manner of a pendulum. A lever arm is attached to the drive motor by means of which the rotatably mounted motor supports itself on a force sensor which is connected with the housing. Thereby, the reaction torque moment of the occurring torquing of the motor housing is transmitted to the force sensor. The sensed force is converted into a torque moment by taking into account the lever arm, whereby the torque moment is precisely proportional to the mass throughput. In that apparatus the motor is suspended like a pendulum and is guided relative to the stationary housing by ball bearings which can falsify the torque moment measurement by their friction. Even if one ascertains this bearing friction by a measurement made during an empty run and then takes the measurement into account, different bearing frictions occur under load operating conditions so that with a motor supported at one side, due to a non-uniform lubrication on the bearing walls, frictions occur that cannot be determined and which falsify the measuring result.

A torque moment measuring device with a torsion articulation is known from European Patent Publication EP 0,590,187 A1 for avoiding such non-uniform friction effects. The torsion articulation introduces the drive torque moment through three vertically arranged leaf springs into at least two separate force sensor elements, whereby the drive torque moment of the motor always bears symmetrically to the rotational axis onto the two force measuring elements. However, for this purpose at least two force measuring elements are required which increase the apparatus effort and expense of the measuring device.

SUMMARY OF THE INVENTION

Therefore, it is the object of the invention to improve a measuring device of the type mentioned above in such a way that with simple means a high measuring precision is achievable.

The invention employs the Coriolis measuring principle in an apparatus which is characterized by the combination of the following features, an impeller, a drive motor for driving impeller with a constant r.p.m., a bulk material supply for feeding said flow of bulk material to said impeller for radially detouring said bulk material flow, a force measuring element, a torque moment transmitting device for transmitting a drive torque moment applied by said motor to said impeller, to said force measuring element, said torque moment transmitting device comprising a rotatable bearing, at least two horizontal angularly spaced leaf spring elements supported by said rotational bearing for rotation about a central axis defined by said rotatable bearing, said at least two horizontal angularly spaced leaf spring elements crossing each other in said central axis for transmitting said torque moment to said force measuring element, said leaf spring elements being flexible in response to bending loads effective in a rotation direction about said central axis and stiff against bending in a leaf spring length direction.

The invention has the advantage that due to the crosswise arranged leaf spring elements, the measuring device always remains fixed on a predetermined rotational axis. Thus, the lever arm length for bearing on a stationary force measuring device cannot vary so that a good zero point stability and measuring value constant is achievable. By these features simultaneously a good insensitivity to temperatures is achieved because the heat expansions can become effective on the lever arm length only in a negligible manner.

According to a special type of embodiment of the invention with an axial ball or toe bearing, it is an advantage that thereby the weight of the drive train is transferrable substantially with low friction onto a stationary housing section, whereby friction caused measuring errors have become substantially avoidable. The drive train includes the impeller, the drive shaft, and the motor. Due to the fact that in such an embodiment the rotation bearing does not have to take up any axial forces, hardly any force shunting effect takes place so that with such a measuring device even small conveying volumes are measurable in an advantageous way and manner. In such an axial support it is also advantageous that the support can be protected in a simple manner against contaminations so that precision is assured over long periods of time.

In a further advantageous embodiment of the invention a friction free horizontal mounting of the drive shaft is achieved with the aid of a fluid bearing in the lead through area so that here friction related measuring errors are also avoided. Simultaneously such a fluid or air bearing assures an excellent sealing to the bulk material space so that the measuring device is advantageously also operable with excess pressure without any apprehension that a contamination and friction increase of the bearing might occur.

BRIEF DESCRIPTION OF THE DRAWINGS

The invention will be explained in more detail with reference to an example embodiment that is shown in the accompanying drawings, wherein.

DETAILED DESCRIPTION OF A PREFERRED EXAMPLE EMBODIMENT AND OF THE BEST MODE OF THE INVENTION

Figure 1:
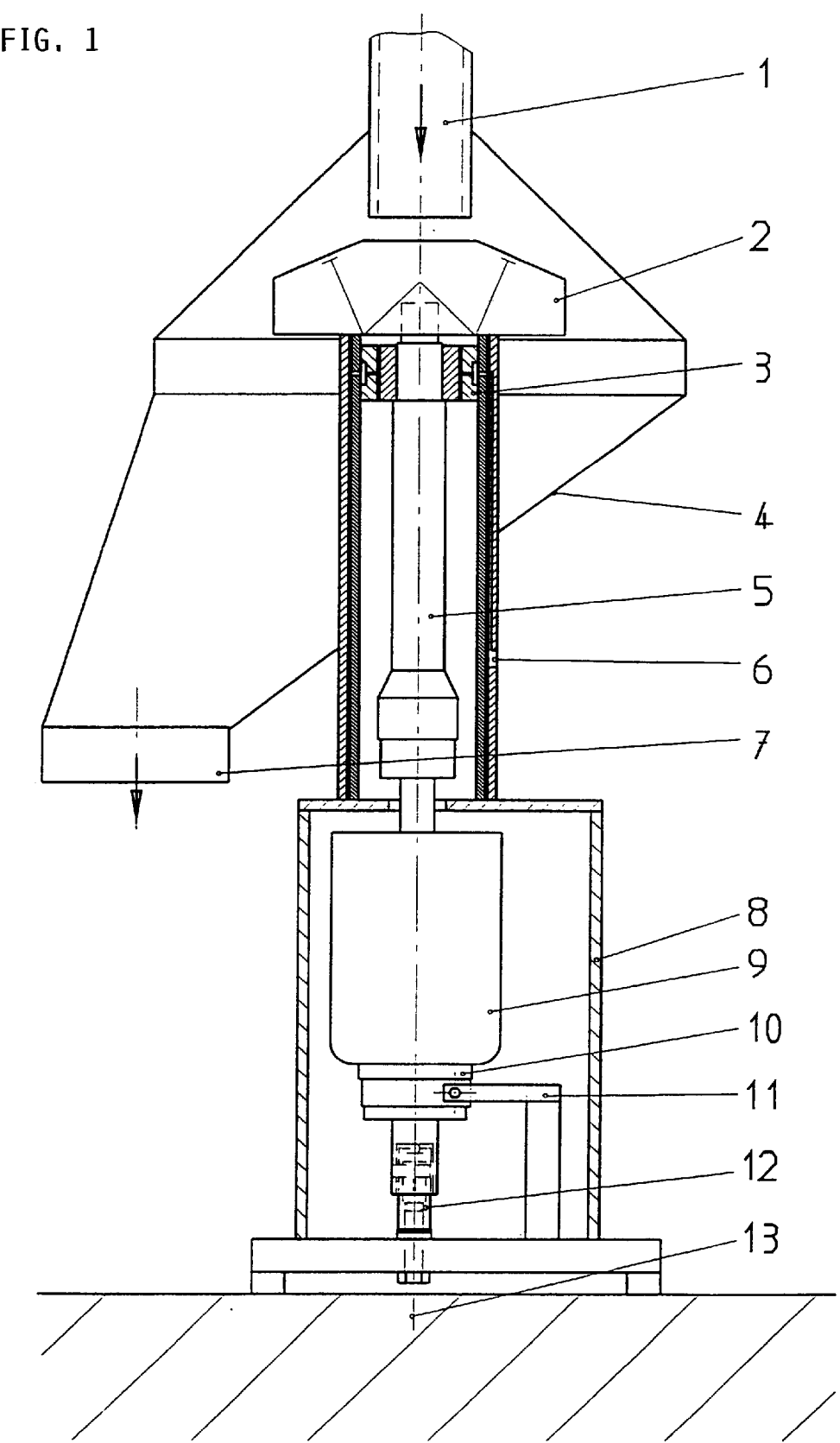
FIG. 1 shows an apparatus for measuring the mass flow.

FIG. 1 of the drawings shows schematically in a sectional view a device for measuring a mass flow in which the impeller 2 is arranged above the drive motor 9 on a lengthened drive shaft 5 and wherein the drive moment is transmitted through a pivot bearing element 12 onto a force sensor 11 as a torque moment measuring device.

The mass flow which is mostly a bulk material flow is guided through a tubular bulk material supply 1 to the center of an impeller 2. The impeller 2 is driven by the drive motor 9 with a constant speed, whereby the bulk material flow is horizontally deflected and flows downwardly through the surrounding bulk material housing 4 and through a bulk material outlet 7. The impeller 2 is mounted on an elongated vertical drive shaft 5 which is mounted by an air bearing 3 horizontally relative to the bulk material housing 4. By means of this air bearing 3 simultaneously a sealing is achieved relative to the bulk material housing 4 so that a contamination of the bearing 3 is substantially avoided. Thereby, however, the air pressure in the bearing 3 must be higher by a certain value than the pressure in the bulk material housing 4. This bearing 3 is thus well suited for bulk material flows which are transported through the measuring device by excess pressure. Such an air bearing 3 is advantageously also substantially free of friction so that the measuring result cannot be falsified by friction losses. This is particularly important for measuring small mass flows because here even small friction losses can lead to relatively large measuring errors. This air bearing 3 is supplied with excess pressure through an air pressure coupling 6 at the housing section 4. Such an excess pressure is usually available in an industrial area of use. Such an air bearing 3 may, however, also be operated with other fluids suitable for such bearings as far as this is necessary for structural or supply technical reasons.

The bulk material housing 4 is secured on a motor housing 8 positioned below and constituting a stationary member. The drive motor 9 is vertically arranged in the motor housing 8. Thereby, the motor 9 is secured at its bottom side on a head plate 10 which supports the entire drive train of the impeller, the drive shaft and the motor on a rotatable pivot bearing element 12. The pivot bearing element 12 comprises substantially an upper bearing bushing 15 and a lower bearing bushing 18 between which a ball 14 is arranged as an axial bearing support. The torque moment measuring device 11 is simultaneously integrated in the pivot bearing 12. The device 11 supplies an electrical signal that is proportional to the throughput value or throughput amount of the bulk material flow.

Figure 2:
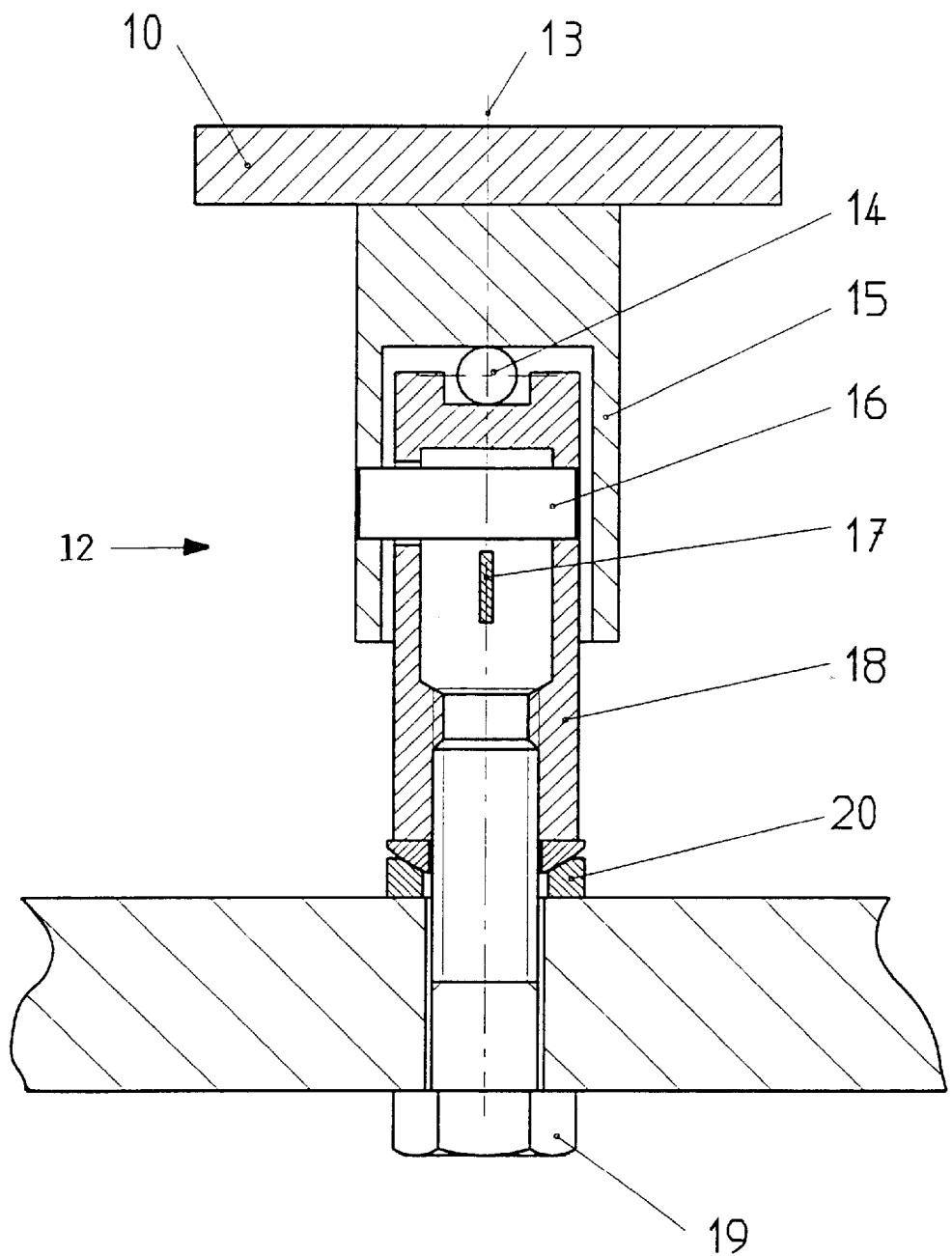
FIG. 2 shows an enlarged illustration of the torque moment measuring device in a side view thereof.
Figure 3:
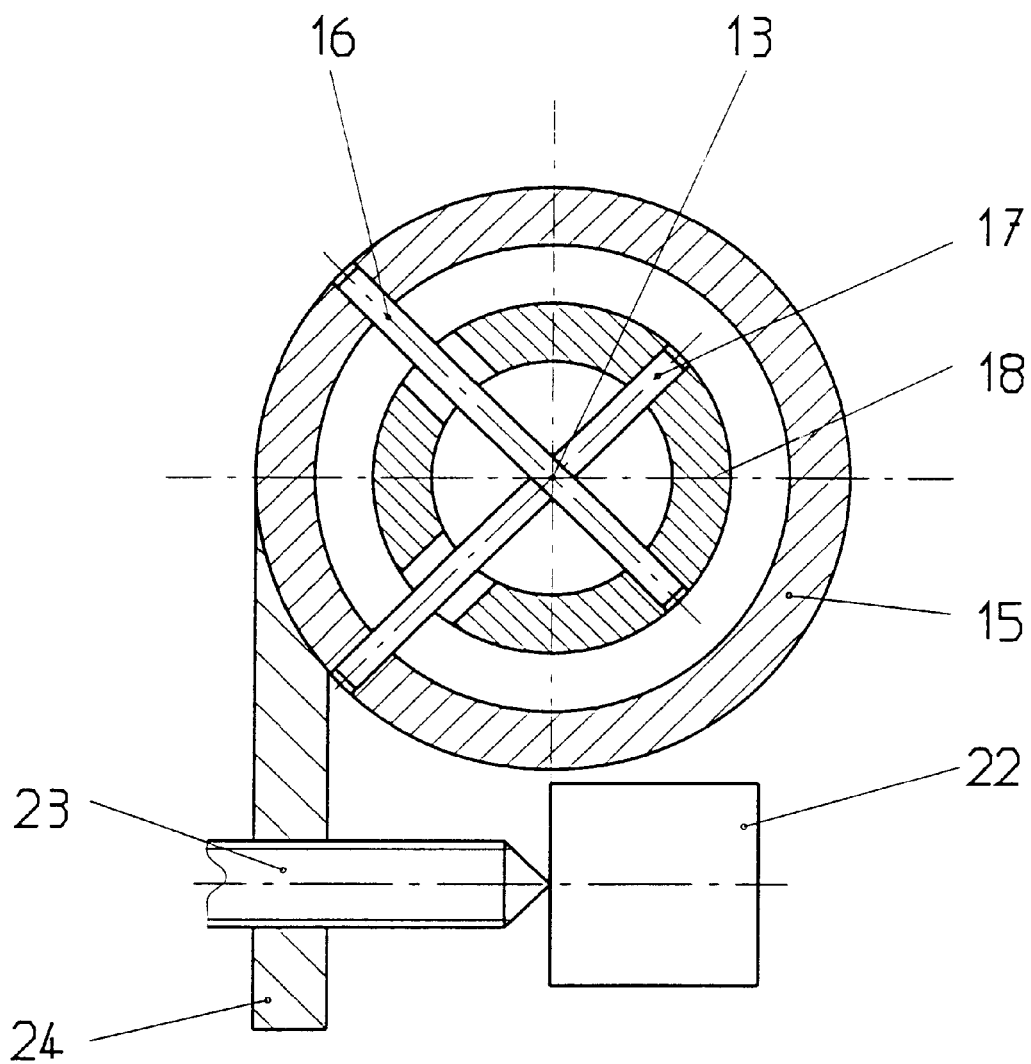
FIG. 3 shows a top plan view of the torque moment measuring device.

The pivot bearing 12 with the torque moment measuring device 11 is shown in detail and enlarged in FIGS. 2 and 3, whereby the same parts in the shown Figs. are provided with the same reference characters. The upper bearing bushing 15 of the pivot bearing 12 is rigidly connected with the head plate 10 and arranged symmetrically to a central rotational axis 13 of the motor 9. The lower bearing bushing 18 is coaxially introduced into the upper bearing bushing 15 which is open downwardly, whereby the lower bearing bushing 18 comprises in its upper section a recess for the ball forming an axial thrust bearing 14. Due to this recess the ball 14 is positioned for rotation about the central rotational axis 13.

The lower bearing bushing 18 is provided in its lower section with a ball pan 20 by means of which the lower bearing bushing 18 is attached vertically and symmetrically to the central rotational axis 13 at the motor housing 4 by means of a securing screw 19. Both bearing bushings 15 and 18 are laterally spaced from each other so that they are rotatable relative to each other without contact.

Leaf spring elements 16, 17 are provided horizontally and crossing each other by 90° in the overlapping area of the two cylindrical bearing bushings 15 and 18. One end of the leaf springs is secured to the upper bearing bushing 15, while the other end of each leaf spring is secured to the lower bearing bushing 18. Since the spring elements 16 and 17 crossing each other are passing through the hollow space of the lower cylinder 18, two lateral cut-outs are provided on the opposite side of the lower bearing bushing 18 for passing the spring elements 16 and 17 through these cut-outs which make possible a certain rotation angle between the two bearing bushings 15 and 18. Thereby, the leaf spring elements 16 and 17 are so constructed that they are easily bendable in the rotational direction of the drive motor 9, but are stiff against bending in the longitudinal direction. Due to the fact that the leaf spring elements 16 and 17 are arranged angularly displaced, they cross each other on the central rotational axis 13, thereby fixing both bearing bushings 15 and 18 symmetrically to the rotational axis 13. Thereby, another crossing angle as well as more than two spring elements may be provided as far as this would be advantageous with due regard to the intended construction of the bearing element. However, it must be assured that the fixing takes place on the provided rotational axis 13. In the vertical direction the leaf spring elements 16 and 17 are arranged in different planes so that a direct contact between the spring elements 16 and 17 is avoided.

Instead of using a ball 14, the axial thrust bearing can be a toe bearing or comparable bearings may be provided as far as these assure an axial thrust bearing substantially free of friction about the rotation axis 13.

A lever arm 24 is secured to the outer circumference laterally and at a right angle to the center of the upper bearing bushing 15. A pressure member 23 is secured horizontally and at a right angle to the end of the lever arm 24. Thereby, the pressure member 23 bears on a force measuring element 22 which is rigidly secured with the bottom of the stationary motor housing 8. The force measuring element 22 may be advantageously embodied by a bending beam equipped with strain gages, which bending beam provides an electrical signal that corresponds to the force.

In operation of the measuring device, the motor 9 bears with its drive moment radially on the force measuring element 22, whereby the drive moment is determined with the aid of the known lever arm 24. The conveyor throughput and/or the conveyed amount can be ascertained from the drive moment in a known manner. Thereby it is assured by the special arrangement of the leaf spring elements 16 and 17 that the rotational axis 13 that is mounted in a fixed position is not displaced out of its radial position to thereby change the predetermined lever arm length even for large load changes. Due to such an angularly displaced, crossing pivot bearing 12, leaf springs 16 and 17 that are very soft in the rotational direction may be used, whereby hardly any force shunting effect occurs that could falsify the measured value. As a result, the present measuring device is useable also for relatively small conveyor throughputs where high precision requirements must be met because this torque moment transmission which is substantially free of force shunting, causes only small measuring errors. These small measuring errors are further reduced in connection with small conveyor throughputs in that air bearings 3 and axial bearings 14 are used which are substantially friction free, whereby friction and force shunting errors can hardly occur in the entire measuring device.

Such bearing supports which are substantially free of friction and free of force shunting can also be used advantageously in measuring devices for large conveyor throughputs. Gear drive motors or intermediate gears are useable in such context provided they are sufficiently free of friction or their friction can be compensated, either by calculation or constructively.

Such a bearing support substantially free of friction and free of force shunting can also be used for suspended drive trains with overhead drives. In that case the inner bearing bushing 18 must be so constructed that the ball 14 is arranged below the bushing cover in a lateral fixation. The outer bearing bushing 15 must then be so constructed that at least one cross piece is provided which passes through the inner bushing 18 below the ball 14. Thus, the axial force of the drive train is transmitted through the cover of the inner bushing and through the ball 14 arranged overhead, onto the cross piece of the outer bushing 15 so that by these features the same function is assured as in a motor mounting 12 arranged below the bulk material container 4. In the lust described alternative embodiment the drive train with its motor 9 is positioned above the impeller 2 and the rotatable pivot bearing 12 with its axial thrust bearing 12 is positioned above the motor.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for measuring a mass flow of bulk material, by applying the Coriolis measuring principle, said apparatus comprising a housing, an impeller rotatably mounted in said housing, a drive motor (9) for driving said impeller with a constant r.p.m. and a bulk material supply for feeding said flow of bulk material to said impeller for radially detouring said bulk material flow by said impeller, a force measuring element (22), a torque moment transmitting device for transmitting a drive torque moment applied by said motor to said impeller, to said force measuring element (22), said torque moment transmitting device comprising a rotatable bearing (12), at least two horizontal, angularly spaced leaf spring elements (16, 17) supported by said rotatable bearing (12) for rotation about a central axis (13) defined by said rotatable bearing (12), said at least two horizontal angularly spaced leaf spring elements (16, 17) crossing each other in said central axis for transmitting said torque moment to said force measuring element (22), said leaf spring elements (16, 17) being flexible in response to bending loads effective in a rotation direction about said central axis and stiff against bending in a leaf spring length direction.

2. The apparatus of claim 1, wherein said at least two horizontal, angularly spaced leaf spring elements (16, 17) are arranged inside said rotatable bearing (12), said rotatable bearing having a first end rigidly connected to said drive motor (9) and a second end rigidly connected to a stationary housing section (8) of said housing, said drive motor (9) having a rotational motor axis, and wherein said motor is so mounted that said motor axis is axially aligned with said central axis (13).

3. The apparatus of claim 1, wherein said rotatable bearing (12) comprises at least two-bearing parts (15, 18) which are rotatable about said central axis (13) and in opposition to each other, and wherein said at least two bearing parts are connected to each other by said at least two horizontal angularly spaced leaf spring elements (16, 17).

4. The apparatus of claim 3, wherein said at least two parts (15, 18) that are rotatable in opposition to each other, are constructed as cylindrical bushings which partially reach coaxially one into the other.

5. The apparatus of claim 3, wherein said rotatable bearing further comprises an axial thrust bearing (14) positioned between said at least two bearing parts (15, 18) that are rotatable in opposition to each other.

6. The apparatus of claim 1, wherein said rotatable bearing (12) comprises an axial thrust bearing (14) positioned above said at least two horizontal angularly spaced leaf spring elements for supporting said drive motor and for permitting rotation about said central axis (13).

7. The apparatus of claim 6, wherein said axial thrust bearing (14) comprises a single ball or toe bearing arranged concentrically with said central axis (13) for transmitting a load through a point on said central axis (13).

8. The apparatus of claim 1, further comprising a drive shaft (5) connecting said motor (9) to said impeller (2) and a horizontal bearing (3) supporting said drive shaft (5) coaxially with said central axis (13).

9. The apparatus of claim 8, wherein said housing comprises a bulk material housing section (4), and wherein said horizontal bearing (3) of said drive shaft (5) is constructed as a fluid bearing for sealing a lead through of said drive shaft (5) into said bulk material housing section (4).

10. The apparatus of claim 9, wherein said fluid bearing (3) is constructed as an air bearing which is arranged in a transition area between said drive shaft (5) and said impeller (2).

11. The apparatus of claim 1, wherein said motor (9) is positioned below said impeller (2), and wherein said rotatable bearing (12) comprises an axial thrust bearing (14) positioned below said motor (9).

* * * * *